United States Patent [19]

Beigang

[11] Patent Number: 5,021,038
[45] Date of Patent: Jun. 4, 1991

[54] DIFFERENTIAL UNIT

[75] Inventor: Wolfgang Beigang, Ruppichteroth, Fed. Rep. of Germany

[73] Assignee: GKN Automotive AG, Siegburg, Fed. Rep. of Germany

[21] Appl. No.: 534,720

[22] Filed: Jun. 7, 1990

[30] Foreign Application Priority Data

Jun. 7, 1989 [DE] Fed. Rep. of Germany ....... 3918565

[51] Int. Cl.[5] .............................. F16H 1/44
[52] U.S. Cl. ..................... 475/85; 475/237; 475/239; 475/150
[58] Field of Search ............... 475/85, 150, 237, 238, 475/239

[56] References Cited

U.S. PATENT DOCUMENTS

4,526,063 7/1985 Oster ............................. 475/239 X
4,719,817 1/1988 Azuma ........................... 475/239 X
4,884,470 12/1989 Onone ............................ 475/237 X Primary Examiner—Dirk Wright
Attorney, Agent, or Firm—Toren, McGeady & Associates

[57] ABSTRACT

A differential gear unit includes a viscous coupling for restricting the differential rotation of output gears (27, 29), with the conneciton of one of the parts (31) of the viscous coupling to one output gear being by way of a releasable connecting device so that the viscous coupling can be brought out of operation when required, e.g. under vehicle braking. The connecting device comprises a sleeve (1), coupling members (11) movable radially in the sleeve (1) to engage, when in radially outermost positions, groove (35) for torque transmission, and an actuating member (2) movable axially within the sleeve and operable on the coupling members. The actuating member (2) is movable by an axially displaceable positioning member (87, 49) through the intermediary of latching balls (68, 48) which are themselves radially displaceable to hold the actuating member in position without continuous application of a high force. The positioning member may be movable mechanically, electro-magnetically, or by fluid pressure.

18 Claims, 6 Drawing Sheets

DIFFERENTIAL UNIT

BACKGROUND OF THE INVENTION

1. Field of the Invention

This invention relates to a differential gear unit, usable in the driveline, e.g. a driving axle, of a motor vehicle, which includes a differential carrier, two output gears and a coupling device, preferably a viscous coupling, for restricting differential rotation of the output gears in dependence on the difference in speed therebetween, the coupling device including first and second parts torque-transmittingly connected respectively to one of the output gears or to the differential carrier and to the other output gear of the differential, one of said torque-transmitting connections being established by way of a releasable connecting device.

2. Description of the Prior Art

A differential gear unit of the type above set forth is disclosed in DE-3707106.8. The use of a viscous coupling to inhibit differential rotation between the output elements of the differential gear, the restriction in the differential action being dependent on the difference in speed between the wheels provides improved traction if there is any tendency for a wheel to slip. During braking, however, particularly if there is an anti-locking braking system, the restriction of differential rotation of the wheels is not required because it hinders the action of the anti-locking system. It is therefore known practice to provide an arrangement which cancels the effect of the viscous coupling during braking. In DE-3707106.8 this is achieved by an externally controlled releasable connecting device which disconnects the viscous coupling from one of the output elements of the differential gear unit, when the brakes of the motor vehicle are applied.

When a differential gear unit is incorporated in the drive line between driven front and wheel axles of a vehicle, also disconnection of the viscous coupling is required during braking. Large forces may be required to be applied to actuate the releasable coupling in this case.

SUMMARY OF THE INVENTION

It is broadly the object of the present invention to provide a differential gear unit of the kind herein first set forth, wherein the releasable connecting device is reliable in operation, quick in response, and operable under the application of relatively small forces only.

According to the invention, there is provided a differential gear unit, comprising a differential carrier, two output gears, and a coupling device for restricting differential rotation of the output gears in dependence on the difference in speed therebetween, the coupling device including first and second parts torque-transmittingly connected respectively to one of the output gears or to the differential carrier and to the other output gear of the differential, one of said torque-transmitting connections being established by way of a releasable connecting device, the releasable connecting device comprising:

a sleeve element;

coupling members guided in openings in the sleeve element for radial movement therein;

an actuating member disposed in said sleeve element and movable axially therein, having at least one formation engagable with said coupling members such that in a first relative position of the sleeve element and actuating member the coupling members are held in radially outer positions to provide a torque transmitting connection with said second part of the coupling device, and in a second relative axial position the coupling members can move radially inwardly to break said torque-transmitting connection;

a positioning member movable axially and operable on said actuating member by way of latching members displaceable at least radially to latching positions;

the latching members being engagable with at least one surface which, as a result of axial force exerted thereon, applies a radial component of force to the latching members to urge them away from their latching positions;

the positioning member having a surface which supports the latching members against said radial component of force.

Preferably the coupling members comprise balls. Several axially spaced circles of such balls may be provided, so that balls of relatively small diameter may be used and hence the sleeve may be of small diameter.

In a differential unit according to the invention, the forces required to be exerted to release and engage the connecting device ar kept relatively low.

Said at least one formation of the actuating member, which is engagable with the coupling members to move them radially, may be self-locking with respect to radial forces applied thereto by the coupling members as a result of torque transmission. In this case, there will be provided means for resiliently biasing the actuating member axially to its second position relative to the sleeve element.

Alternatively, said at least one formation of the actuating member may be non-self-locking relative to radial forces applied thereto by the coupling members, so that the radial forces on the coupling members as a result of torque transmission result in sufficient axial force on the actuating member to displace it to its second position relative to the sleeve element without requiring the provision of resilient biasing means.

The positioning member may have spokes which extend radially outwardly through openings in the sleeve element, a ring being provided on the outermost ends of the spokes to be engaged so as to be axially movable by an operating element. By way of example, such an operating element may be a cam or eccentric movable about an axis which extends radially relative to the positioning member. The ring on the outermost ends may have a radial thrust surface to be engaged by the cam or eccentric.

Alternatively, electro-magnetic or fluid pressure operable (pneumatic or hydraulic) means may be provided for moving the actuating member.

In one embodiment, an electro-magnet of annular configuration may be disposed outside the sleeve element, surrounding the positioning member for moving it axially. The positioning member may be mounted for rotation in a ring member, and the ring member may be in the form of a magnetically attractable armature while the positioning member is of a magnetically non-conductive material.

In further embodiments described hereafter, the means for axially moving the positioning member may be disposed within a drive flange body which forms an extension of the sleeve element. The positioning member may be movable directly by a piston subject to fluid pressure established within the drive flange body and applied thereto by passage means which extend from outside the drive flange body. Alternatively, electromagnetic means for moving the positioning member may be disposed within the drive flange body, the electromagnetic means being energised by way of sliding contacts.

Yet a further possibility is that the positioning member may be moved axially by centrifugally operable means within the drive flange body. This expedient may be adopted to ensure that when a vehicle provided with the differential unit is travelling at a high speed, the viscous coupling cannot be connected to provide any restriction of the differential action of the unit. Restriction of differential action at high speed may be detrimental to the stability of the vehicle. Such a centrifugally operable means may comprise centrifugal weights having bearing portions engaging a groove provided in the drive flange body, the weights having formations engaging the positioning member and being constrained by annular spring means.

BRIEF DESCRIPTION OF THE DRAWINGS

The invention will now be described by way of example with reference to the accompanying drawings, of which.

DESCRIPTION OF THE PREFERRED EMBODIMENT

In the following description, the same reference numerals are used for parts physically or functionally corresponding to each other in the various embodiments described.

Figure 1:
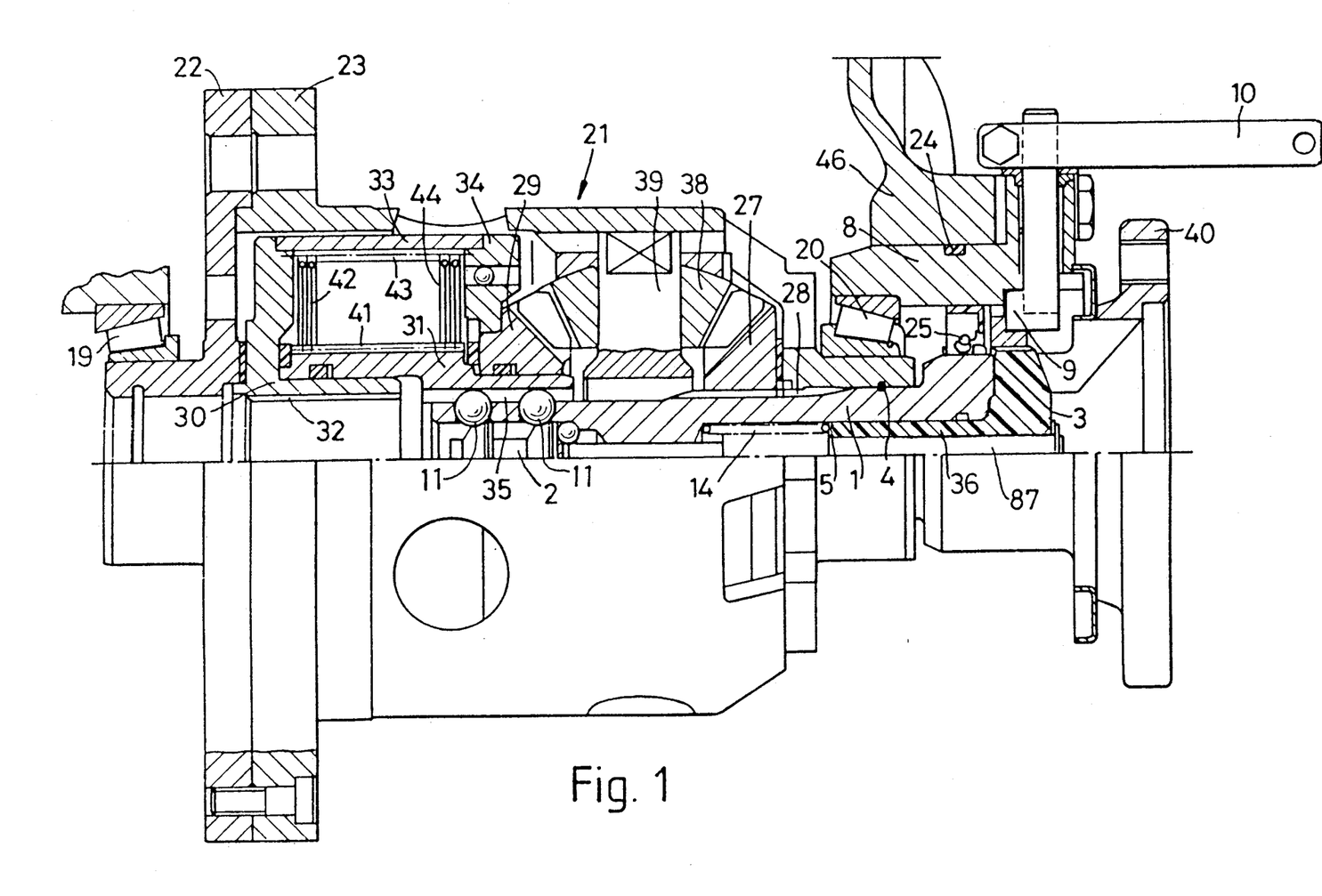
FIG. 1 is a part section through a first embodiment of differential gear unit according to the invention.

Referring firstly to FIG. 1 of the drawings, there is shown a differential gear unit of which part of a housing is indicated at 46, wherein a differential carrier 21 is rotatably supported by taper roller bearings 19, 20. The differential carrier 21 is in two parts 22, 23, the latter being in the shape of a hollow body and the former comprising a cover therefor, the two parts being held together at a bolted flange. The second roller bearing 20 is held in an annular bearing carrier 8 which is sealed with respect to the differential housing by a seal 24. Outwardly of the housing, the bearing carrier 8 extends to provide a support for an operating lever 10 to be described hereafter.

The differential carrier 21 supports a number of differential bevel pinions, one of which is indicated at 38, the pinions being carried on individual pins 39 of a spider member. Bevel side gears (output gears) 27, 29 are engaged by the bevel differential pinions 38, the side gear 27 being splined at 28 to a sleeve 1. The sleeve 1, located by a circlip 4, where it extends out of the housing of the differential gear unit, is formed as a drive flange 40 for bolted connection to a half shaft. A seal 25 within the bearing carrier 8 engages the sleeve 1. The other bevel side gear 29 is connected to an internally splined output sleeve 30 by way of a hollow generally cylindrical member 33 and a member 34, which respectively constitute the outer casing part and one end cover part of a viscous coupling. The opposite end cover part of the viscous coupling is provided by a radially outwardly extending part of the sleeve 30. Sleeve 30 provides for connection of another output element which may have a drive flange for connection to a half shaft, by a splined connection engaging the splines 32.

The viscous coupling further comprises (in addition to the outer casing part 33, the flange part extending from the sleeve 30 which forms one end cover, and the opposite end cover part 34) an inner casing part in the form of a sleeve 31. In known manner, two sets of annular plates are arranged with a first set of plates 42 received on splines 41 on the inner casing part 31, interleaved with the plates 44 of a second set thereof engaging internal splines 43 provided in the outer casing part 33. The viscous coupling also contains a viscous liquid such that when the inner casing part rotates relative to the outer casing part of the coupling, shear in the liquid between the two sets of plates inhibits such relative rotation in a speed-dependent manner. The inner casing part 31 of the viscous coupling extends axially in the form of a sleeve within the bevel side gear 29, and various seals are provided to seal the inner casing part relative to the side gear and to the sleeve 30.

The sleeve extension of the inner casing part 31 is provided internally with axially extending grooves 35 within which are engagable coupling members in the form of balls 11 received in apertures in the extension of the sleeve 1 which aligns therewith. These balls 11, provided in two rows in the illustrated embodiment, are able to move radially in the apertures in the sleeve 1, such that when they are in radially outermost positions they provide a torque transmitting connection between the sleeve 1 and the inner casing part 31. It will be appreciated that when this condition is established, the two sets of plates of the viscous coupling are connected respectively to the two output gears of the differential gear unit, so as to inhibit the differential action therebetween. When the balls 11 move radially inwardly to disengage from the grooves 35, the viscous coupling is no longer connected to the sleeve 1 and hence cannot inhibit the differential action. The mechanism for controlling such movement of the balls 11 will now be described more particularly with reference to FIG. 2 of the drawings.

Figure 2:
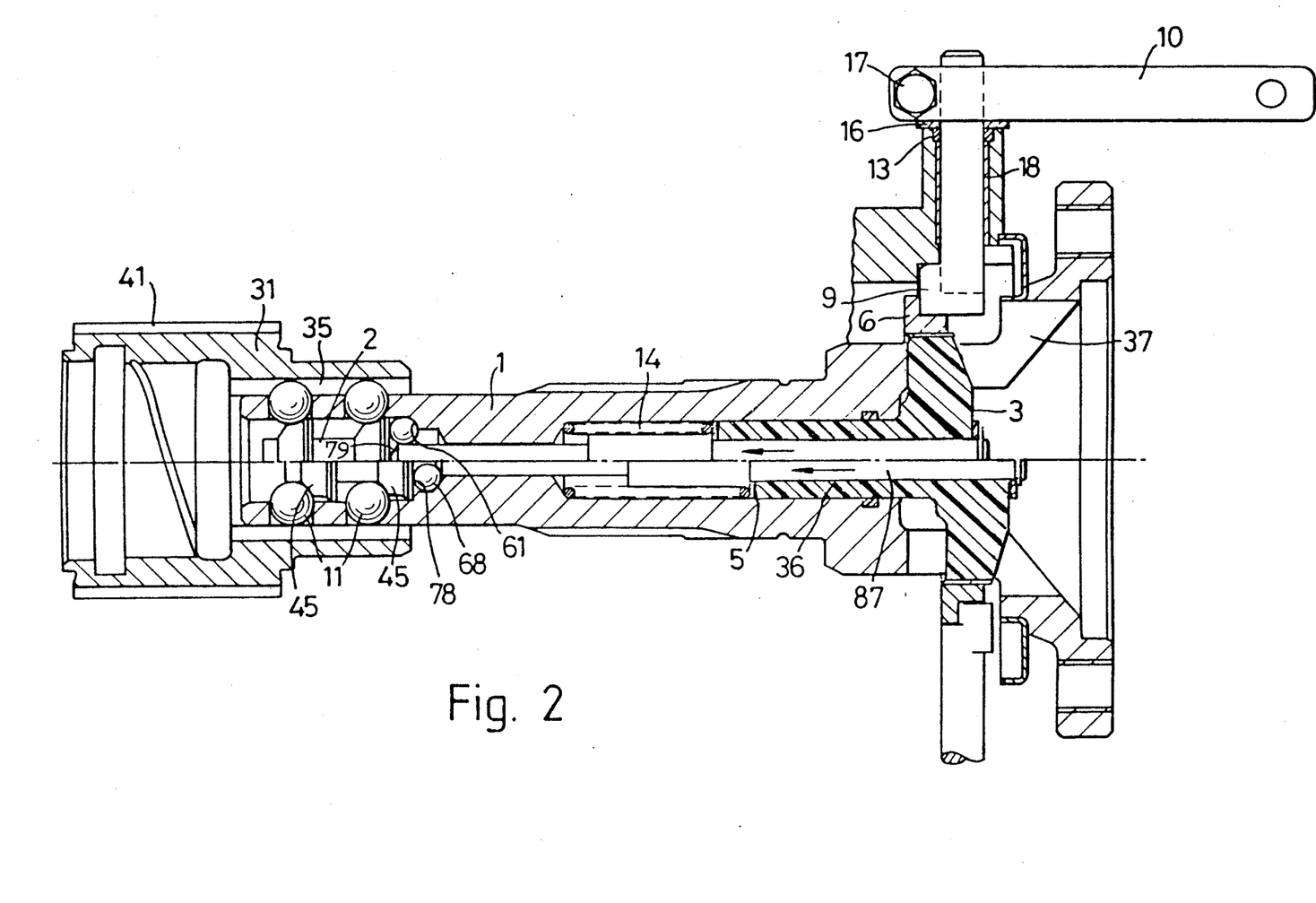
FIG. 2 is a view of the main parts which form the releasable connecting device of the differential gear unit of FIG. 1.

Within the region of the sleeve 1 provided with the holes receiving the balls 11, there is disposed an actuating member 2. The actuating member 2 has two camming formations 45 which are generally of frustoconical configuration, so that when the actuating member 2 is moved axially it engages the balls 11 and urges them radially outwardly to engage the grooves 35. The actuating member 2 is movable axially by a positioning and locking journal 87 which extends through the sleeve 1 and is connected to a component which is in the form of a further sleeve 36 with spokes 3 which extend radially outwardly from its one end, through circumferentially spaced apertures 37 provided in the sleeve 1 adjacent the flange 40. The sleeve 36 abuts an abutment ring 5 seating on a step on the positioning and locking journal 87, so as to be able to press the journal in the direction towards the left (with reference to the drawings), and a compression spring 14 is disposed outside the journal 87 to spring bias it in the opposite direction. Outside the sleeve 1, the spokes 3 are engaged by a switching ring 6 which is pressable axially by an eccentric 9 provided on the end of a shaft rotatably supported in a bush 18 in an extension of the bearing carrier 8 outside the housing 46. Angular movement of the eccentric 9 and its shaft is caused by the operating lever 10, which is held on the shaft by a pinch bolt 17 whilst a thrust washer 16 and seal 13 are provided where the shaft emerges from the bearing carrier 8.

At its end adjacent the actuating member 2, the journal 87 is provided with a frusto-conical surface 79. A number of latching members in the form of balls 68 are provided, and the interior of the sleeve 1 is here of a configuration which includes a recess able to accommodate the latching balls radially outwardly of the end of the journal 87, the balls engaging a support surface 61, leading into a smaller diameter portion in which the balls are not able to be accommodated radially outwardly of the journal 87.

FIG. 2 shows the above described mechanism in two operative positions, namely a first position, in the upper half of the drawing, wherein a torque transmitting connection is provided between the sleeve 1 and the sleeve 31, and in the lower half of the drawing in a disconnected condition. In the latter condition, the journal 87 is in its position wherein the balls 68 are in the smaller diameter part of the interior of the sleeve 1, disposed axially between the frusto-conical end 79 of the journal 87 and a flat end surface 78 of the actuating member 2.

When the engaged position is required to be assumed, the operating lever 10 is moved angularly so that the eccentric 9 pushes the switching ring 6 to the left. The movement of journal 87 thus caused, in addition to compressing the spring 14, presses the latching balls 68 and thus the actuating member 2 to the left which in turn urges the balls 11 radially outwardly. When they are in alignment with the grooves 35, the balls 11 move radially outwardly enabling the actuating member 2 to complete its axial movement to the left. As this happens, the latching balls 68 come into alignment with the enlarged recess in the interior of sleeve 1, and by virtue of the frusto-conical surface 79 move radially outwardly so as to be held axially between the surface 78 of the actuating member 2 and the surface 61 within the sleeve 1. The end of the journal 87 prevents radial inward movement of the latching balls 68. This secures the engaged position of the balls 11, and only the force which is needed to overcome the force exerted by the spring 14 is required to be exerted to hold this engaged position.

If the load on the operating lever 10 is removed, the journal 87 moves to the right due to the force of the spring 14, to release the latching balls 68. The actuating member 2 is then free to move to the right to resume the position shown in the lower half of FIG. 2. The balls 11 are moved radially inwardly by the force due to torque transmission and the cross-sectional shape of the grooves 35.

The shape of the cam surface 45 provided on the actuating member 2 may be self-locking with respect to radial forces exerted on the balls 11 during torque transmission.

It will be appreciated, of course, that in the condition shown in the upper half of FIG. 2, the torque transmitting connection established between the sleeve 31 and the sleeve 1 by way of balls 11 means that the viscous coupling is in effect connected between the output elements of the differential, to inhibit differential rotation therebetween in accordance with the difference in their rotational speeds, whilst in the disconnected condition the output elements of the differential unit are free for differential rotation.

Figure 3:
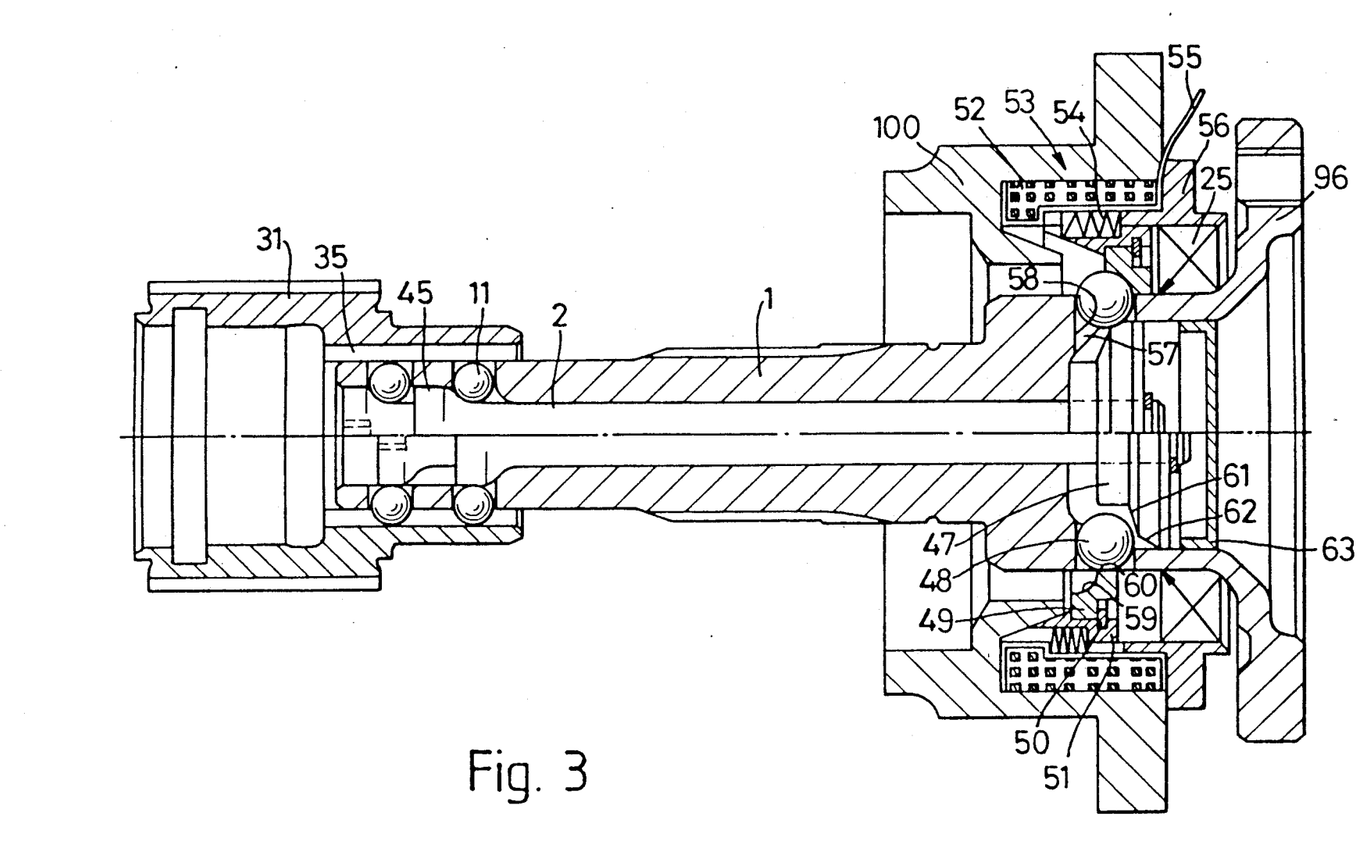
FIG. 3 is a view of an alternative embodiment of releasable connecting device.

Referring now to FIG. 3 of the drawings, this shows an alternative form of actuating mechanism for a differential unit as shown in FIG. 1. The configuration of the sleeve 31 and the left hand end of sleeve 1 are as above described in relation to FIG. 2, and there are coupling members in the form of balls 11 movable radially in apertures in the end portion of the sleeve 1. The actuating member 2 extends through the sleeve 1, instead of being movable by the journal 87 extending through the sleeve 1. The actuating member 2 has formations 45 which provide camming surfaces for moving the balls 11 radially outwardly.

At the right hand end of the sleeve 1, where it is enlarged to form a drive flange 96 for attachment of a half shaft, the sleeve 1 has apertures wherein latching balls 48 are received for radial movement. A bearing carrier 100 is shown, provided with a electro-magnet winding 52 on a spool carrier 56.

A ring 51 is shaped as a magnetically attractable armature and is supported on the spool carrier 56 by compression springs 54, biasing the ring 51 axially to the right. The springs 54 are disposed in recess in the ring 51 and spool carrier 56. A positioning and locking sleeve 49 is mounted for rotation in the ring 51, and is secured axially by a circlip 50.

The positioning and locking sleeve 49 which is moved axially with the ring 51 has an internal contour which comprises a thrust ring surface 59 and a locking surface 60, operable on the latching balls 48. The balls are supported axially against a surface 58 in the sleeve 1, and are engagable with a member 47 which has a frusto-conical holding surface 61 and an operating surface 62 which is of lesser conical angle than the surface 61. Beyond the member 47, the hollow interior of the sleeve 1 where it opens out into the flange 96 is closed by a cover 63.

FIG. 3 shows two operative positions: in the upper half of the drawing the actuating member 2 is at its position wherein no torque transmitting connection is provided between the sleeve 1 and the sleeve 31, and in the lower half of the drawing the parts are in the position wherein such a connection is provided. In the bottom half of the drawing, the ring 51, which forms a magnetic armature, is held by the electro-magnet winding 52 when it is energised in its extreme left hand position, against the restoring force of the springs 54. In this condition the locking surface 60 of the positioning and locking sleeve 49 holds the latching balls 48 in a position between the supporting surface 58 in the sleeve 1 and the supporting surface 61 of the member 47. The actuating member 2, which is of course firmly connected axially to the member 47, supports the coupling balls 11 on operating formations 45 in engagement with the grooves 35 in the sleeve 31. The formations 45 are generally conically shaped so as to be non-self-locking with respect to radial forces exerted by the coupling balls 11 in response to torque transmission.

If the electro-magnet winding 52 is de-energised, the ring 51 is no longer held in its extreme left hand position and the springs 54 move it and the positioning and locking sleeve 49 to the extreme right hand position as shown in the upper half of FIG. 3. The balls 48 are thereupon free to move radially outwardly due to the axial force acting on the actuating member 2 and member 47, freeing the member 47 to move to the left. When the actuating member is moved to the left by virtue of the conical shape of the formations 45 whereby the radial force on the coupling balls 11 causes an axial force on the actuating member, the coupling balls 11 are able to move radially inwardly and break the connection between the sleeve 1 and the sleeve 31.

If the electro-magnet winding 52 is energised, the ring 51 is moved to the left and with it the switching and locking sleeve 49. The surface 59 of the latter moves the latching balls 48 radially inwardly, which act on the surface 62 of the member 47 to move the latter to the right and resume the position shown in the lower part of FIG. 3.

Figure 4:
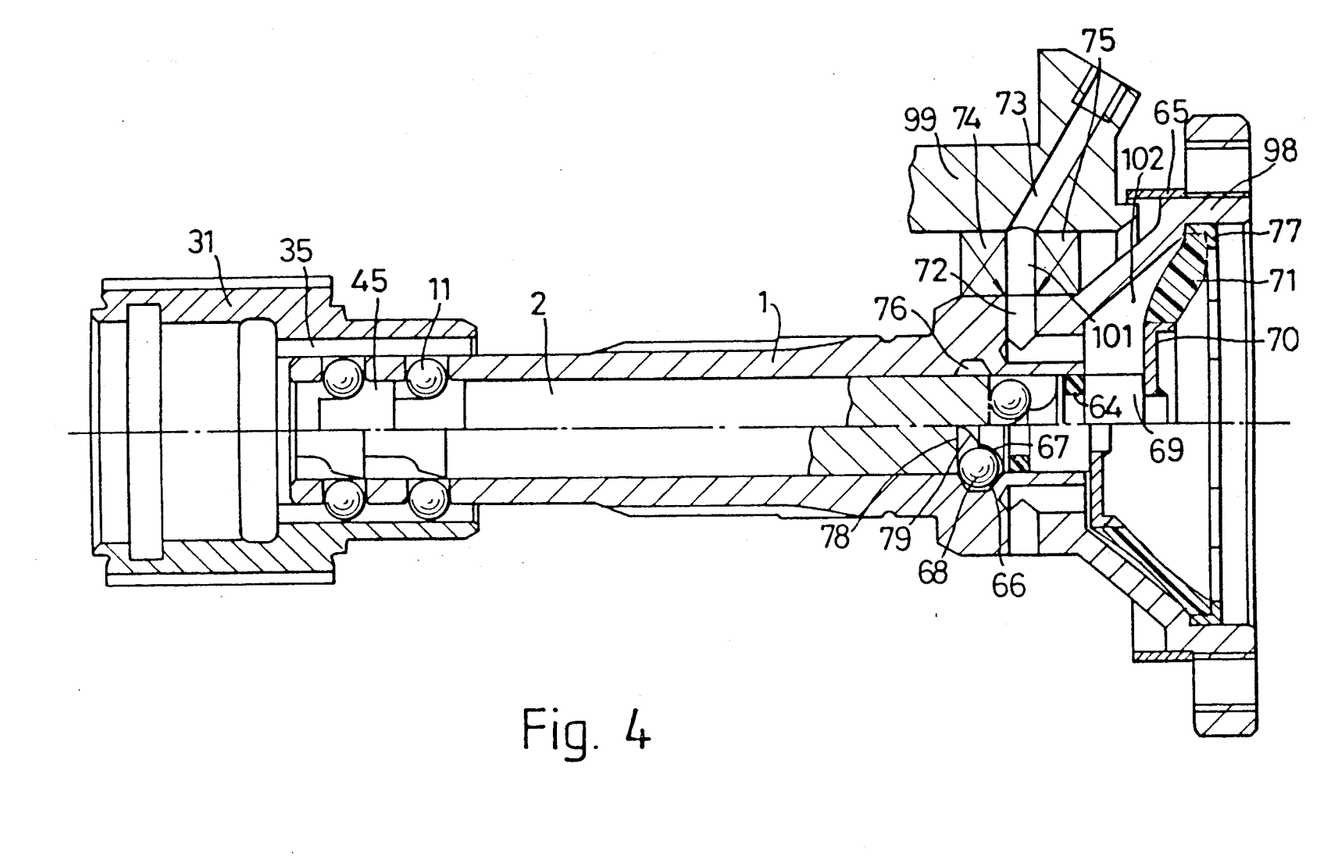
FIG. 4 is a view of yet a further embodiment of releasable connecting device for the differential unit.

FIG. 4 shows an embodiment of actuating mechanism operable by fluid pressure. The sleeve 1 opens into a drive flange 98 containing a piston 70 and spring diaphragm 71, behind a cover 77. The drive flange 98 carries a protective ring 65. A bore 73 in bearing carrier 99 communicates with an annular space 101 between shaft seals 74, 75, and thence with bores 72 in the sleeve 1 communicating with chamber 102 which is closed by the piston 70 and spring diaphragm 71.

The piston 70 carries a positioning and locking member 69 which projects into a bore in the sleeve element 1 and is sealed with respect thereto by a seal 64. At its end remote from the piston 70, the positioning and locking member 69 is formed with a locking surface 67 and a thrust surface 79, engagable with latching balls 68. The latching balls 68 abut a supporting surface 78 on the actuating member 2. The balls 68 are able to enter an annular groove 76 in the sleeve 1 when the actuating member 2 is in the axial position shown in the lower half of FIG. 4, wherein the coupling balls 11 are engaged in the grooves 35 in the sleeve 31.

The actuating mechanism may be operated by application of high pressure or vacuum to the chamber 102. In the former case, the piston 70 may be spring biased to the left by the spring diaphragm 71, thereby to urge the actuating member to the position wherein the coupling balls 11 engage the sleeve 31 and establish a torque transmitting connection between the sleeves 1 and 31. Alternatively, another spring may be provided for this purpose. When high pressure fluid is applied to the chamber 102 by way of the bore 73, annular gap 101, and bores 72, it urges the piston 70 to the right, releasing the locking balls 68 and permitting the actuating member 2 to move to the right under the influence of radial forces exerted by the coupling balls 11.

If the actuating mechanism is operated by application of vacuum to the chamber 102, the diaphragm spring 71 may draw the piston 70 to the right or another spring may be provided for this purpose. When chamber 102 contains ambient pressure, the disconnected position of the coupling balls 11, as shown in the upper half of FIG. 4, is assumed. Application of vacuum to the chamber 102 causes the coupling position to be adopted.

Figure 5:
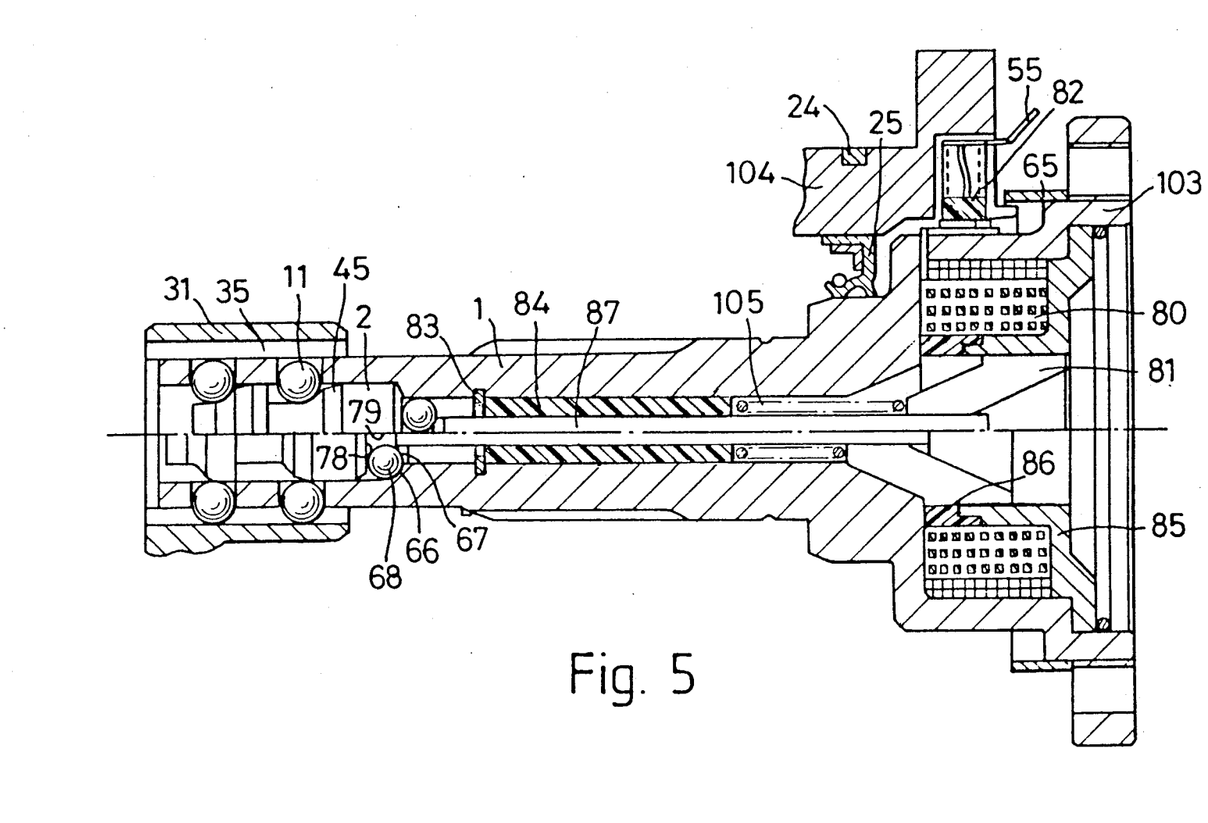
FIG. 5 is a view of yet a further embodiment of releasable device.

FIG. 5 shows an alternative embodiment of mechanism actuated by electro magnetic-means. Where the sleeve 1 opens into the drive flange 103, electro-magnet winding 80 is disposed in its interior on a spool carrier 85 provided with an insulating ring 86. The electro-magnet winding 80 can be energised by way of an arrangement of sliding contacts 82 provided in the bearing carrier 104. Also visible in this embodiment are seals 24, 25, and a protective sleeve 65.

Within the sleeve 1 there is disposed a bearing sleeve 84 and a positioning and locking journal 87 provided, at its end which lies within the electro-magnet assembly, with an armature 81. A compression spring 105 is disposed between the armature 81 and the bearing sleeve 84. The bearing sleeve 84 abuts a circlip 83 in an annular groove within the sleeve 1. The arrangement is such that energisation of the electro-magnet 80 causes the armature 81 and thus the positioning and locking journal 87 to move to the left.

At its left hand end, the positioning and locking journal 87 operates on latching balls 68 and an actuating member 2 operable on coupling balls 11, generally in the manner above described in relation to FIGS. 1 and 2 of the drawings, the same reference numerals being used for these parts.

Figure 6:
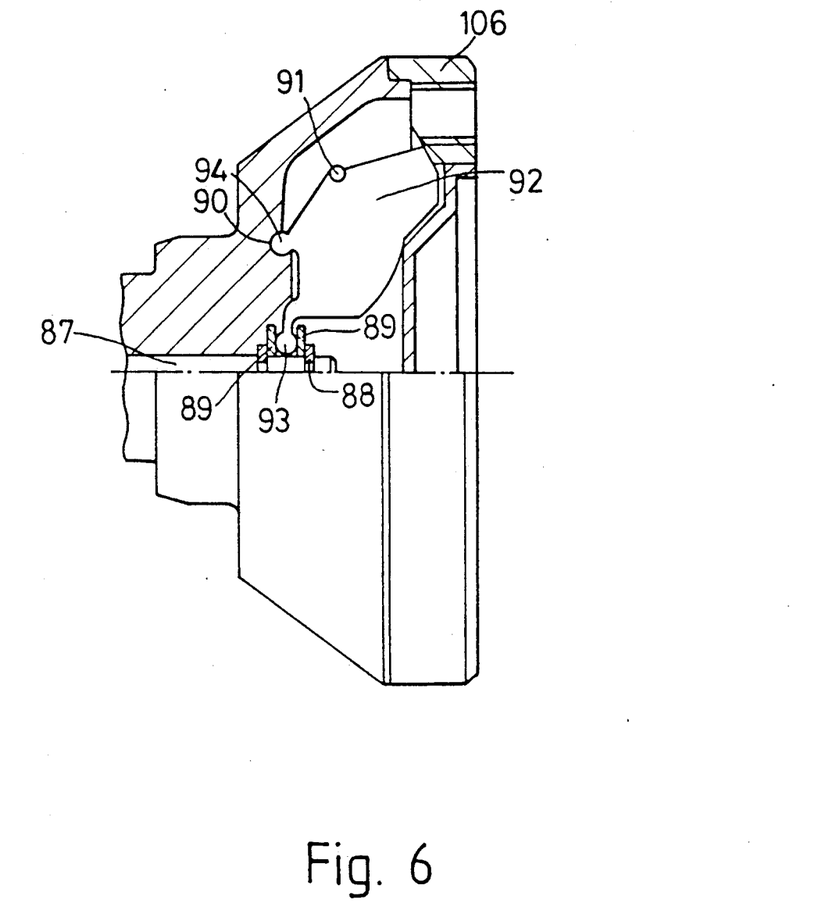
FIG. 6 is a view of an actuating mechanism for yet a further embodiment of releasable connecting device.

When the electro-magnet 80 is energised, the armature 81 is moved to the left to cause the torque transmitting connection to be established by balls 11 between the sleeve 31 and the sleeve 1. When the electrical supply to the electro-magnet is switched off, spring 105 moves the positioning and locking journal 87 to the right, leading to the torque transmitting connection between the sleeves 31 and 1 being disconnected FIG. 6 shows an arrangement for centrifugal actuation of the positioning and locking journal 87. A drive flange 106 is shown in whose interior centrifugally responsive weights 92 are mounted, by bearing parts 94 engaging in an annular groove 90, for generally radial movement against the restoring force of an annular spring 91. The weights 92 carry formations 93 which engage between discs 89 held on the positioning and locking journal 87 by circlips 88, to move the journal axially as the weights move radially.

When the centrifugal force on the weights 92 exceeds the restoring force of the annular spring 91, the weights are displaced radially outwardly and the journal 87 is moved axially to the right.

I claim:

1. A differential gear unit, comprising a differential carrier, two output gears, and a coupling device for restricting differential rotation of the output gears in dependence on the difference in speed therebetween, the coupling device including first and second parts torque-transmittingly connected respectively to one of the output gears or to the differential carrier and to the other output gear of the differential, one of said torque-transmitting connections being established by way of a releasable connecting device, the releasable connecting device comprising:

a sleeve element;

coupling members guided in openings in the sleeve element for radial movement therein;

an actuating member disposed in said sleeve element and movable axially therein, having at least one formation engagable with said coupling members such that in a first relative position of the sleeve element and actuating member the coupling members are held in radially outer positions to provide a torque transmitting connection with said second part of the coupling device, and in a second relative axial position the coupling members can move radially inwardly to break said torque-transmitting connection;

a positioning member movable axially and operable on said actuating member by way of latching members displaceable at least radially to latching positions;

the latching members being engagable with at least one surface which, as a result of axial force exerted thereon, applies a radial component of force to the latching members to urge them away from their latching positions;

the positioning member having a surface which supports the latching members against said radial component of force.

2. A differential unit according to claim 1 wherein said at least one formation of the actuating member is self-locking with respect to radial force applied thereto by said coupling members, and the actuating member is resiliently biased axially to its second position relative to the sleeve element.

3. A differential unit according to claim 1 wherein said at least one formation of the actuating member is non-self-locking with respect to radial force applied thereto by said coupling members, to displace the actuating member axially to its second position relative to the sleeve element.

4. A differential unit according to claim 1 comprising at least one recess in the sleeve element, wherein said latching members can engage to support the actuating member in its first axial position relative to the sleeve element.

5. A differential unit according to claim 1 comprising electro-magnetic means for moving the actuating member.

6. A differential unit according to claim 5 comprising an electro-magnet of annular configuration surrounding said positioning member for moving it.

7. A differential unit according to claim 6 wherein said positioning member is mounted for rotation in a ring member.

8. A differential unit according to claim 7 wherein said ring member is in the form of a magnetically attractable armature, and the positioning member is of a magnetically non-conductive material.

9. A differential unit according to claim 1 comprising fluid pressure operable means for effecting axial movement of said positioning member.

10. A differential unit according to claim 1 wherein means for axially moving the positioning member is disposed within a drive flange body.

11. A differential unit according to claim 10 wherein the positioning member is movable directly by a piston subject to fluid pressure established within the drive flange body and applied thereto by passage means extending from outside the drive flange body.

12. A differential unit according to claim 10 comprising electro-magnetic means for moving the positioning member, the electro-magnetic means being energised by way of sliding contacts.

13. A differential unit according to claim 10 comprising centrifugally operable means for moving the positioning member.

14. A differential unit according to claim 13 comprising centrifugal weights having bearing portions engaging a groove in the drive flange body, the weights having formations engaging the positioning member and being constrained by annular spring means.

15. A differential unit according to claim 1 wherein said coupling members comprise balls.

16. A differential unit according to claim 1 wherein said coupling device comprises a viscous coupling.

17. A differential unit according to claim 1 wherein said releasable connection connects the part of the coupling device to one output gear of the differential unit.

18. A differential gear, more particularly for use in a driving axle of a motor vehicle, with a locking arrangement, more particularly in the form of a viscous coupling, of which the locking effect is dependent on the difference in speed between the two axle shaft bevel gears, and of which the parts producing the locking effect, which can rotate with respect to one another, can be optionally connected, one with the differential cage or one of the bevel gears in a torsionally rigid manner, and the other with the other one of the bevel gears, with a disconnecting device for making and releasing a positive locking connection between the second of the locking arrangement parts which can rotate with respect to each other and the second of the bevel gears, characterised in that the disconnecting device has radially movable coupling members, which are guided in radial openings of a sleeve element, and a selector shaft, guided in an axial manner in the sleeve element, with at least one switching lug which acts from inside on the coupling members, whereby the sleeve element and the selector shaft can be moved axially with respect to one another and the coupling members in a first relative position of sleeve and shaft move back into the sleeve element for disconnecting and in a second relative position of sleeve and shaft, for connecting, come out of the sleeve element and are locked in a radial manner by the selector shaft, and in that a positioning and locking sleeve or journal can be acted upon axially by a positioning member and the selector shaft can be moved axially into the connecting position by means of locking members which are displaced radially or axially by a thrust ring surface of the locking sleeve or journal, and in that at least one of the positioning surfaces of the selector shaft, which act on the locking members is conical in design such that the locking members undergo a radial force component acting in an unlocking direction through the axial restoring force of the selector shaft or of the sleeve element which is brought about particularly due to torque loading, and in that the positioning and locking sleeve or the positioning and locking journal is provided with a cylindrical or conical locking surface to secure the locking members against the radial restoring force.

* * * * *